(12) United States Patent
Günther

(10) Patent No.: US 8,264,372 B2
(45) Date of Patent: Sep. 11, 2012

(54) COMMUNICATION DEVICE

(75) Inventor: Thomas Günther, Langenhagen (DE)

(73) Assignee: ABB AG, Mannheim (CH)

( * ) Notice: Subject to any disclaimer, the term of this patent is extended or adjusted under 35 U.S.C. 154(b) by 571 days.

(21) Appl. No.: 12/552,852

(22) Filed: Sep. 2, 2009

(65) Prior Publication Data

US 2010/0052942 A1    Mar. 4, 2010

(30) Foreign Application Priority Data

Sep. 3, 2008 (DE) .......................... 10 2008 045 612

(51) Int. Cl.
*G08C 15/06* (2006.01)
(52) U.S. Cl. ................ 340/870.02; 340/870.03
(58) Field of Classification Search ............ 340/870.02, 340/870.03; 702/47, 50, 51, 52, 53, 54, 55; 73/861.64, 204.19, 861.52, 861.42, 861.22
See application file for complete search history.

(56) References Cited

U.S. PATENT DOCUMENTS

2007/0163362 A1*   7/2007   Wehrs et al. ............... 73/861.42

FOREIGN PATENT DOCUMENTS

DE    10 2004 062 132 A1    7/2006
WO    WO 03/044521 A1    5/2003

OTHER PUBLICATIONS

German Search Report dated Mar. 30, 2009.
Siemens AG et al., "Messung des Durchflusses mit Hilfe von RFID z.B. in Rohrbuendelreaktoren order Rohren", ip.com, Oct. 2007, pp. 1-2.
Klaus Finkenzeller, "Grundlagen und praktische Anwendungen induktiver Funkanlagen, Transponder und kontaktloser Chipkarten" RFID-Handbuch, 2002, 5 pages (including pp. 13; 312-313).

* cited by examiner

*Primary Examiner* — Joseph Lauture
(74) *Attorney, Agent, or Firm* — Buchanan Ingersoll & Rooney PC

(57) ABSTRACT

A communication device is disclosed for communicating telemetry data relating to a fluid, which is passed through a group of concatenated containers such as pipes, tanks and the like in a process installation, to a data processing device. The communication device includes a measuring sensor which can be spatially separated from the data processing device, the measuring sensor having a transponder and a converter for converting a physical variable of the fluid into an electrical variable. The measuring sensor can communicate with a reading device assigned to the data processing device, the measuring sensor being concomitantly loosely guided in the fluid.

10 Claims, 2 Drawing Sheets

COMMUNICATION DEVICE

RELATED APPLICATION

This application claims priority under 35 U.S.C. §119 to German Patent Application No. 10 2008 045 612.8 filed in Germany on Sep. 3, 2008, the entire content of which is hereby incorporated by reference in its entirety.

FIELD

The disclosure relates to a communication device for transmitting data, such as telemetry data relating to a fluid, which is passed through a group of concatenated containers such as pipes, tanks and the like in a process installation, to a data processing device.

BACKGROUND INFORMATION

In this disclosure, the term fluid is intended to encompass liquids and gases, flowable solids and solids processed in flowable form, for instance granules, dusts, suspensions, colloids or sludges, insofar as they can be passed through pipelines.

In telemetry, measuring sensors and a data processing device can be spatially separated from one another and can be operatively connected, at least temporarily, by suitable communication devices. In this respect, WO 03/044521 A1 discloses using RFID (Radio Frequency Identification) technology to assign a static identification to a rigid dimensionally stable body in a readable manner in order to identify the body. For this purpose, the body is provided with a transponder which essentially includes an antenna, an analog communication circuit, a digital circuit and a permanent memory. The body's identification is stored in the memory in such a manner that it can be overwritten.

WO 03/044521 A1 also discloses arranging an RFID-based sensor for foodstuff and medicament packaging directly on the packaging in order to detect information (e.g., expiration dates) of the foodstuffs and medicaments.

According to the teaching from DE 10 2004 062 132 A1, the transponder contactlessly communicates with a reading device which has been brought to within range of the transponder such that a radio-frequency electromagnetic field generated by the reading device is changed by the transponder using load modulation on the basis of the stored identification. The field changes are detected in the reading device and the identification coded therein is reconstructed.

For this purpose, the transponder is provided with a control device which is assigned a sensor for detecting physical parameters. According to the disclosure, the transponder is used for communication for the purpose of identifying, that is to say recognizing, items.

Passive transponders are supplied from the energy of the radio-frequency electromagnetic field, while active transponders are provided with a local energy source.

The reading device may be provided with a device for forwarding received data from the transponder to an external data processing device, or may itself be a data processing device.

It is also known to determine physical properties of a product with the aid of sensors, which are suitable for converting a physical variable of the product into an electrical variable, and to transmit the properties to a data processing device.

In automation technology in particular, known sensors can involve a large installation for cables, pipe connections and the like. As a result, subsequent installation or measurement at measuring locations which are difficult to access or are moving, in particular, can be very difficult and even partially prevented. In addition, the known sensors are stationary.

SUMMARY

A communication device is disclosed for communicating telemetry data, regarding a fluid passed through a process installation, to a data processing device, the communication device comprising: a measuring sensor configured for spatial separation from a data processing device, the measuring sensor including a transponder and a converter for converting a physical variable of a fluid into an electrical variable, the measuring sensor being configured for operative cooperation with a reading device assigned to a data processing device for contactless communication with the reading device; and the measuring sensor being configured to move and be guided by the fluid during communication with the recording device.

A method for measuring a physical variable of a fluid is disclosed comprising: combining a measuring sensor with the fluid; processing the fluid containing the measuring sensor in a process installation, the measuring sensor being guided by the fluid through the process installation into contactless range of a reading device assigned to a data processing device; and reading data regarding the physical variable of the fluid from the measuring sensor via the reading device.

BRIEF DESCRIPTION OF THE DRAWINGS

Further details and advantages of the disclosure are explained in more detail below using exemplary embodiments as illustrated in the drawings, wherein.

DETAILED DESCRIPTION

Figure 1:
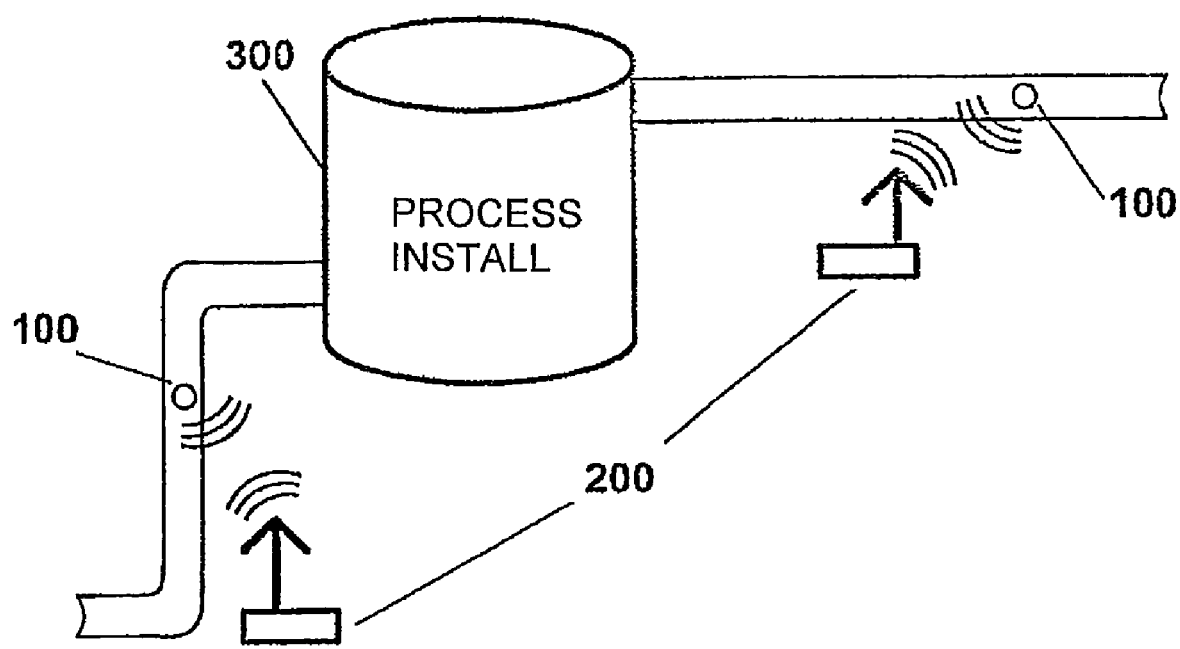
FIG. 1: shows a basic illustration of an exemplary communication device in a process installation.

FIG. 1 shows an exemplary embodiment of a communication device wherein at least one physical property, or variable, of a fluid can be detected independently of a location of a reading device, in a location-independent manner, and held for transmission to a data processing device.

The communication device can communicate (e.g., transmit) telemetry data relating to a fluid, which is passed through a group of concatenated containers such as pipes, tanks and the like in a process installation, to a data processing device, using a measuring sensor spatially separated from the data processing device.

According to the disclosure, an exemplary measuring sensor can include a transponder and a converter for converting a physical variable of the fluid into an electrical variable. The converter can be connected to an electronic circuit in the transponder in such a manner that the electrical variable output by the converter can be retrieved by a reading device if desired, as an alternative to or in conjunction with identification data stored in the transponder's memory. The measuring sensor can be carried by a fluid flowing through the containers in a process installation, and thereby moved through the installation.

It is known to selectively record measured values at precisely the locations of permanently installed measuring sensors. Exemplary embodiments as disclosed herein can also record a continuous time profile of a measured variable in a batch, in a sequence of the process.

In this case, a converter-specific physical variable of the product can be converted into an electrical variable in each supplied transponder independently of the type of supply, and held as a current physical property of the fluid in such a manner that it can be retrieved. Upon retrieval, the data can be transmitted (i.e., passively or actively) to a reading device using any known transport mechanism such as, without limitation, those used with known systems, including systems as described in WO 03/044521, the disclosure of which is hereby incorporated by reference in its entirety.

In addition to the presence of a fluid, at least one physical property of the fluid can also be made available without external visual or mechanical contact with the fluid. In this case, physical properties in the fluid can be measured even in a potentially explosive environment and where limitations exist for hygienic reasons (e.g., a sterilized sensor 100 can be placed in the fluid).

The FIG. 1 communication device is shown in a process installation 300 which is essentially formed by a container or a group of concatenated containers such as pipes, tanks and the like. A fluid of the type described herein can be passed through the containers in the process installation 300, at least one measuring sensor 100 being configured to concomitantly move with the fluid through the process installation 300 in the fluid. The sensor can be packaged as a function of the fluid of the FIG. 1 process installation (e.g., to withstand coarseness of particlulate contained in the fluid) and the process to which the fluid is subject (e.g., to withstand possible turbulence, pressure, corrosion and/or temperature conditions), as well as size considerations such as a size of a smallest pipe diameter and/or other conduit dimensions as shown in FIG. 1.

In this case, the measuring sensor 100 is configured for operative cooperation (e.g., is suitably programmed) for cooperation with a reading device such that when the measuring sensor enters the range of nearby reading devices 200 it can be contactlessly connected to the latter for communication purposes. A radio-frequency electromagnetic field generated by the reading device 200 can be changed by the measuring sensor 100 by means of load modulation on the basis of the data to be transmitted. The field changes are detected in the reading device 200 and the data coded therein are reconstructed.

In a first exemplary embodiment, the measuring sensor 100 is configured to operate without power and/or to be supplied (e.g., powered) from the energy of the radio-frequency electromagnetic field, and is referred to as a passive transponder below. In this case, on its way through the process installation 300, a measuring sensor 100 having a passive transponder can pass one or more reading devices 200 which temporarily activate and/or read a passing measuring sensor 100 at planned (or unplanned) locations in the process installation 300 and read out the recorded measured value.

In an alternative exemplary embodiment, the measuring sensor 100 is provided with a local power supply as an energy store, which supplies energy to the measuring sensor 100. A transponder in a measuring sensor 100 of this embodiment is referred to herein as an active transponder.

Figure 2:
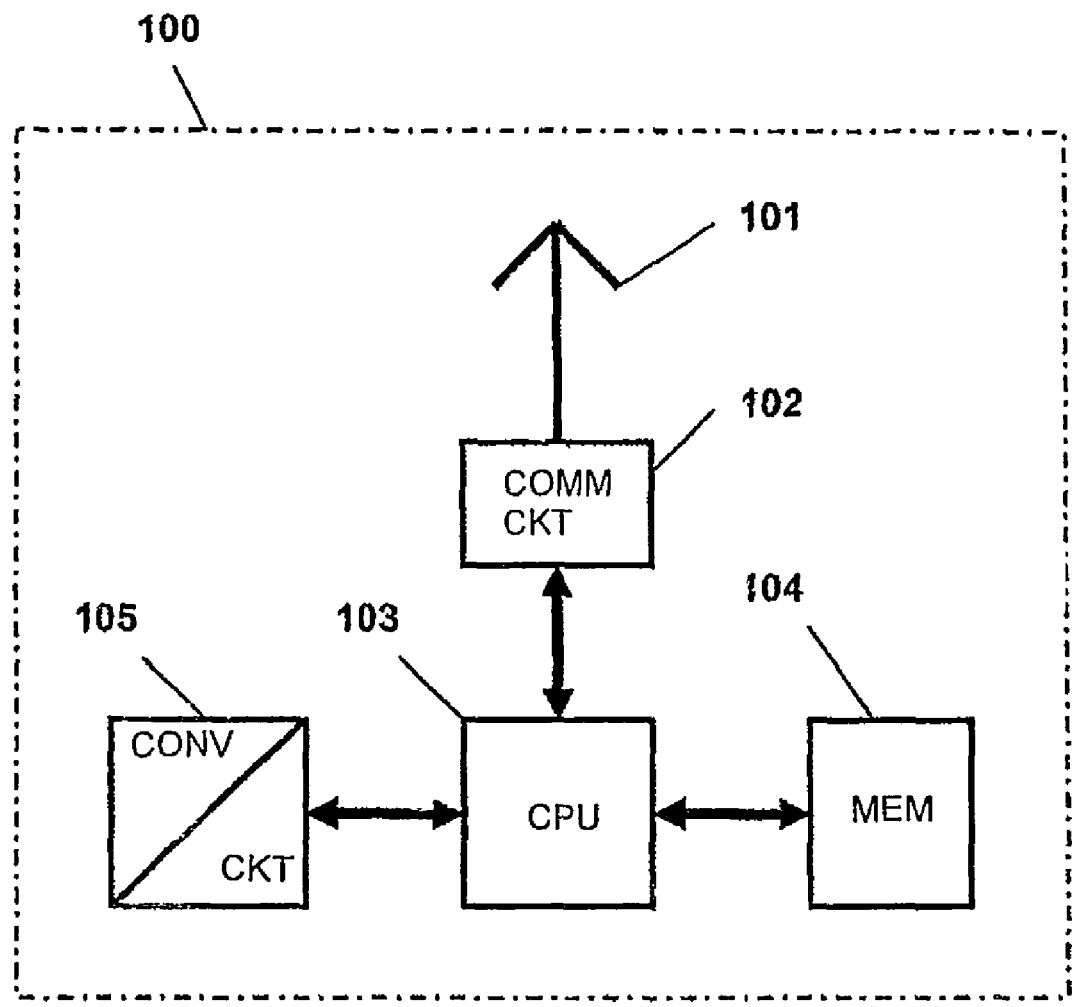
FIG. 2: shows a basic illustration of an exemplary measuring sensor according to the disclosure.

FIG. 2 is a basic illustration of an exemplary measuring sensor 100 suitable for carrying out the disclosure. The measuring sensor 100 has an antenna 101 which is connected to a communication circuit 102 such as a transponder having an optional on-board power supply. A digital circuit 103 which is connected to a memory 104 is also provided. The measuring sensor 100 also has a converter 105 for converting a physical variable into an electrical variable, the converter being connected to the digital circuit 103. The digital circuit 103 can, for example, be implemented by one or more sensing devices (e.g., temperature sensor) and a means for processing data, such as a CPU (e.g., a computer or microcontroller). Features of the FIG. 2 sensor can, of course, be combined into a single unit or be included as separate subcomponets in any desired manner.

Static information for identifying the measuring sensor 100 can be stored in the memory 104. In the case of a measuring sensor 100 having an active transponder, provision can be made for measured values of the physical variable to be recorded continuously, periodically or randomly and to be recorded in the memory 104. Upon entering a desired range of a reading device 200, any or all of the series of measurements can be transmitted to the reading device 200.

While storing and transporting the fluid, a physical variable of the fluid, such as the temperature, can be periodically recorded, or recorded at any desired time (e.g., random or otherwise). In the case of predefinable events, such as shipment or delivery to customers, the reading device 200, which can for example have data processing means, can be used to read out any or all of the recorded series of temperature measurements.

The practice of recording the physical variable during the entire process, transportation and/or storage advantageously can make it possible to simply and continuously monitor particular conditions over time. This makes it possible to detect the occurrence of impermissible conditions, for example the exceeding of the maximum temperature during production, interruption in the cold chain, compliance with particular minimum cooking times and the like. As a result, quality control and quality assurance can be assisted with batch identification.

If, as an option, the measuring sensor 100 remains in the end product after leaving the process installation 300, monitoring can be continued during continued storage and/or transportation to the end customer, and/or can be monitored even after the end product is used by the customer.

The communication device according to the disclosure can advantageously be used in conjunction with a method to allow measurement of a fluid at any desired point in the process and, for example, in a potentially explosive environment or any desired process and/or environment. In addition, the communication device can be used in a very flexible manner both with stationary and with mobile reading devices 200.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

100 Measuring sensor
101 Antenna
102 Communication circuit
103 Digital circuit
104 Memory
105 Converter
200 Reading device
300 Process installation

What is claimed is:

1. A communication device for communicating telemetry data, regarding a fluid passed through a process installation, to a data processing device, the communication device comprising:

a measuring sensor configured for spatial separation from a data processing device, the measuring sensor including a transponder and a converter for converting a physical variable of a fluid into an electrical variable, the measuring sensor being configured for operative cooperation with a reading device assigned to a data processing device for contactless communication with the reading device; and the measuring sensor being configured to move and be guided by the fluid during communication with the reading device.

2. The communication device as claimed in claim 1, wherein the measuring sensor is configured to be externally powered from an electromagnetic field.

3. The communication device of claim 2, in combination with a reading device, wherein the electromagnetic field is generated by the reading device.

4. The communication device as claimed in claim 1, comprising:

a local power supply.

5. The communication device of claim 1, in combination with a process installation for processing a fluid, and comprising:

a container for transporting the fluid within the process installation;

a reading device configured for contactless communication with the communication device when the communication device is guided by the fluid to within a desired range of the reading device.

6. The communication device of claim 5, in combination with the process installation, wherein the process installation comprises:

a group of concatenated containers formed by a series of pipes and tanks.

7. The communication device of claim 6, wherein the communication device has a size selected as a function of a size of a smallest pipe diameter of the process installation.

8. The communication device of claim 1, comprising:

a memory for storing one or more measurements of the measuring sensor.

9. The communication device of claim 1, wherein the transponder is a passive transponder.

10. Method for measuring physical variables of a fluid comprising:

combining a measuring sensor with the fluid;

processing the fluid containing the measuring sensor in a process installation, the measuring sensor being guided by the fluid through the process installation into contactless range of a reading device assigned to a data processing device; and reading data regarding the physical parameters of the fluid from the measuring sensor via the reading device.

* * * * *